United States Patent [19]
Silbermann

[11] 3,846,576
[45] Nov. 5, 1974

[54] PARTITION WITH OPENINGS FOR PLUGGING THROUGH VOLTAGE-CARRYING CONTACTS

[75] Inventor: Erich Silbermann, Bubenreuth, Germany

[73] Assignee: Siemens Aktiengesellschaft, Munchen, Germany

[22] Filed: Apr. 11, 1973

[21] Appl. No.: 350,045

[30] Foreign Application Priority Data
Apr. 20, 1972 Germany.............................. 2219432

[52] U.S. Cl.......... 174/67, 200/50 AA, 200/168 G, 339/40
[51] Int. Cl............................................. H01r 13/44
[58] Field of Search ......... 174/66, 67, 5 R; 339/36, 339/40; 200/168 G, 168 H, 50 AA

[56] References Cited
UNITED STATES PATENTS

| 818,387 | 4/1906 | Metheany | 339/40 |
|---|---|---|---|
| 1,481,368 | 1/1924 | Hope | 339/40 |
| 3,295,025 | 12/1966 | Tjebben | 200/50 AA X |

Primary Examiner—J. V. Truhe
Assistant Examiner—David A. Tone
Attorney, Agent, or Firm—Kenyon & Kenyon Reilly Carr & Chapin

[57] ABSTRACT

An improved shutter for closing off the holes in an insulated partition between a circuit breaker space and a bus bar space when the circuit breaker is removed in which spherical members, each attached to one end of a respective rope which has its other end let through a small hole above the hole to be covered and held in place by a knob on its other end, are suspended by the ropes to lie against and cover the holes.

7 Claims, 2 Drawing Figures

PARTITION WITH OPENINGS FOR PLUGGING THROUGH VOLTAGE-CARRYING CONTACTS

BACKGROUND OF THE INVENTION

This invention relates to switching installations in general and more particularly to an improved shutter for closing off holes in the partitions used in some switching installations.

In certain types of switching installations, such as those with retractable power circuit breakers, the individual switch gear cubicles are subdivided into a number of spaces which are separated from each other for safety reasons. For example, in a switching arrangement shown in German Offenlegungsschrift 1,490,305 the switch gear cubicle is divided into a space for the power circuit breaker and a space for the bus bars or cable connectors. The two spaces are divided by an insulated partition. The partition contains holes through which the uninsulated contact ends of the power circuit breaker may extend and engage mating contacts within the bus bar or cable connector space.

In order to allow work to be performed in the power circuit breaker space when the circuit breaker is retracted, without subjecting a worker to any danger, means must be provided to cover the openings through which the contacts of the circuit breaker normally extend. This will prevent the possibility of hot gases entering into the circuit breaker space should a short circuit occur in the bus bar or cable connector space. In typical prior art arrangements, the openings which are provided in one or a plurality of insulating plates between the circuit breaker space and the bus bar or cable connector are provided with hinged flaps or shutters which will be moved out of the way by the power circuit breaker pins or contacts as the circuit breaker is inserted through the holes. To prevent accidental opening of the flaps by personnel working in the circuit breaker space, each of the holes is provided with a tubular projection extending out from the insulating plates and sized such that the switch contact will pass therethrough but that a worker's finger cannot accidentally be inserted through the hole to open the flap.

Although the prior art flaps work well, they have a number of disadvantages. The most significant disadvantage is that, because they are designed to prevent unintentional opening, intentional opening, which is required for some types of maintenance, becomes more difficult and must be performed using a special tool.

Thus, it can be seen that there is a need for a type of flap for use in such switching installations which has the safety advantages of the prior art flap but still permits the flap to be easily opened when required.

SUMMARY OF THE INVENTION

The present invention provides a type of flap which satisfies these requirements. The shutter or flap is made in a spherical shape and is attached to the end of a rope or cord which is passed through the panel above the hole to be covered and has a knob on the other end to hold it in place. This allows the spherical member to hang opposite the opening in the insulating panel and effectively close it off when the circuit breaker is removed. If for some reason it is desired to open the hole the worker need only pull on the knob to lift the spherical member away from the opening. When the circuit breaker is inserted with its contacts extending through the holes they will push the sphere aside and continue through to contact their mating contacts in the bus bar or cable connector space.

DETAILED DESCRIPTION OF THE PREFERRED EMBODIMENT

Figure 1:
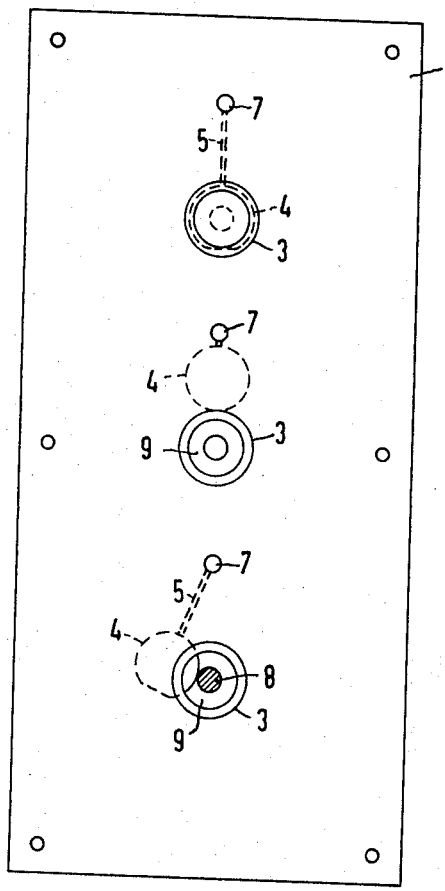
FIG. 1 is an elevation view of a preferred embodiment of the present invention showing three possible positions of the spherical member.
Figure 2:
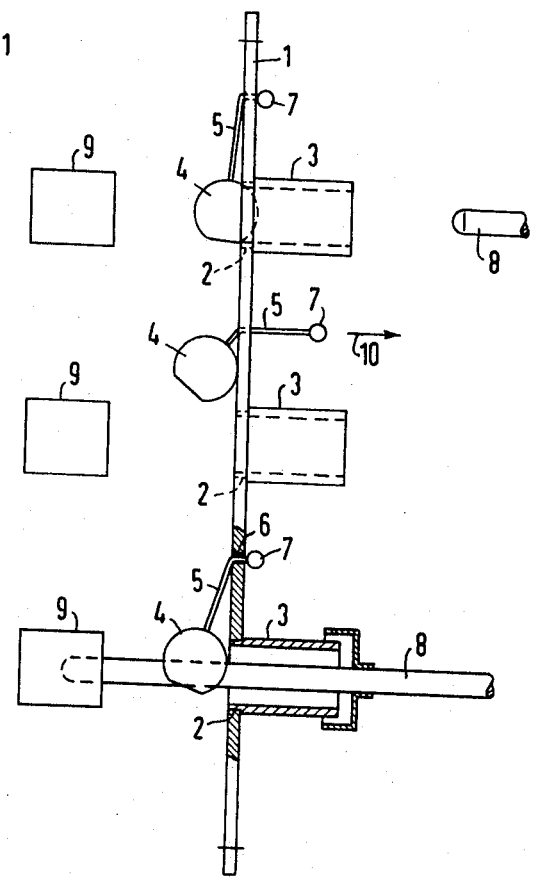
FIG. 2 is an end view partially in cross section of the embodiment of FIG. 1.

The preferred embodiment of the present invention is illustrated by FIGS. 1 and 2. Shown is an insulating panel 1 which is used to separate the circuit breaker space from the bus bar or cable connector space. Thus, on the left hand side of FIG. 2 there are shown a plurality of contacts 9 representing bus bar contacts. On the right of the drawing are shown contacts 8 representing the contacts on the circuit breaker which is to be plugged into the contacts 9. As shown, the panel contains three openings or holes 2. (Three openings are shown only by example. Other panels may have more or fewer openings depending on the particular installation.) Associated with each opening 2 is a tubular projection 3 extending toward the circuit breaker side of the partition to prevent accidental opening as described above. The shutters or flaps of the present invention comprise spherical members 4 which are attached to a ropes 5 or the like, which are led through a small hole 6 in the panel and have a knob 7 placed on their ends, the knob 7 being larger than the hole 6 through which the rope 5 extends to prevent the rope from slipping out.

The uppermost hole 2 is shown with the spherical member 4 hanging down over the hole 2 and closing it off. This illustrates the situation where the contact 8 has been retracted. The hole is effectively closed off to prevent any gases entering into the circuit breaker side from the bus bars side. The middle hole 2 is shown with the knob 7 of its spherical member 4 pulled in the direction of arrow 10. This illustrates how a worker may grasp the knob 7 and pull it to remove the spherical member 4 from the hole 2 so that he may gain access thereto for maintenance purposes. The lowermost hole 2 is shown with the contact 8 extending therethrough. As the contact is pushed through the hole, it will push the spherical member 4 out of the way and permit it to rest against the contact 8.

Instead of using a rope 5 to suspend the spherical member 4 it is also possible to suspend it using one or several rubber bands, flexing springs or the like. Such an arrangement, which makes use of forces other than gravity to hold the spherical member against the hole, is particularly advantageous, for example, in ship-board applications where the spherical member must be kept in place even as the ship pitches and rolls. Similarly, such an installation is useful where the switching arrangement is subject to mechanical shocks.

Thus, an improved shutter for closing off partitions in switching installations which is safe and still permits easy removal of shutter when necessary has been shown. Although a specific embodiment has been illustrated and described, it will be obvious to those skilled in the art that various modifications may be made without departing from the spirit of the invention which is intended to be limited solely by the appended claims.

What is claimed is:
1. In a switching installation wherein an insulating partition is placed between a bus bar space and a circuit breaker space, the partition having holes therein through which circuit breaker contacts may pass to plug into mating contacts in the bus bar space, apparatus to close off the holes when a circuit breaker is removed, comprising, for at least one hole in the panel, a spherical member vertically suspended, by means attached above the hole, said means permitting movement of said spherical member in at least one direction, to lie opposite the hole on the bus side, whereby a circuit breaker contact being inserted through the hole will push said spherical member out of its way and retraction of the circuit breaker contact will allow said spherical member to rest against the hole closing it off.

2. The invention according to claim 1 wherein said suspending means comrpise means which are elastic.

3. In a switching installation wherein an insulating partition is placed between a bus bar space and a circuit breaker space, the partition having holes therein through which circuit breaker contacts may pass to plug into mating contacts in the bus bar space, apparatus to close off the holes when a circuit breaker is removed, comrpising, for at least one hole in the panel, a spherical member vertically suspended, by means led through a further hole said means permitting movement of said spherical member in at least one direction, to lie opposite the hole on the bus side, whereby a circuit breaker contact being inserted through the hole will push said spherical member out of its way and retraction of the circuit breaker contact will allow said spherical member to rest against the hole closing it off.

4. The invention according to claim 3 wherein a knob is attached to the end of said suspending means which is led through the panel.

5. The invention according to claim 4 wherein said further hole comprises a smaller hole directly above the hole to be covered.

6. The invention according to claim 5 wherein said suspending means comprises a rope.

7. The invention according to claim 3 wherein said suspending means comprise means which are elastic.

* * * * *